Figure 1:
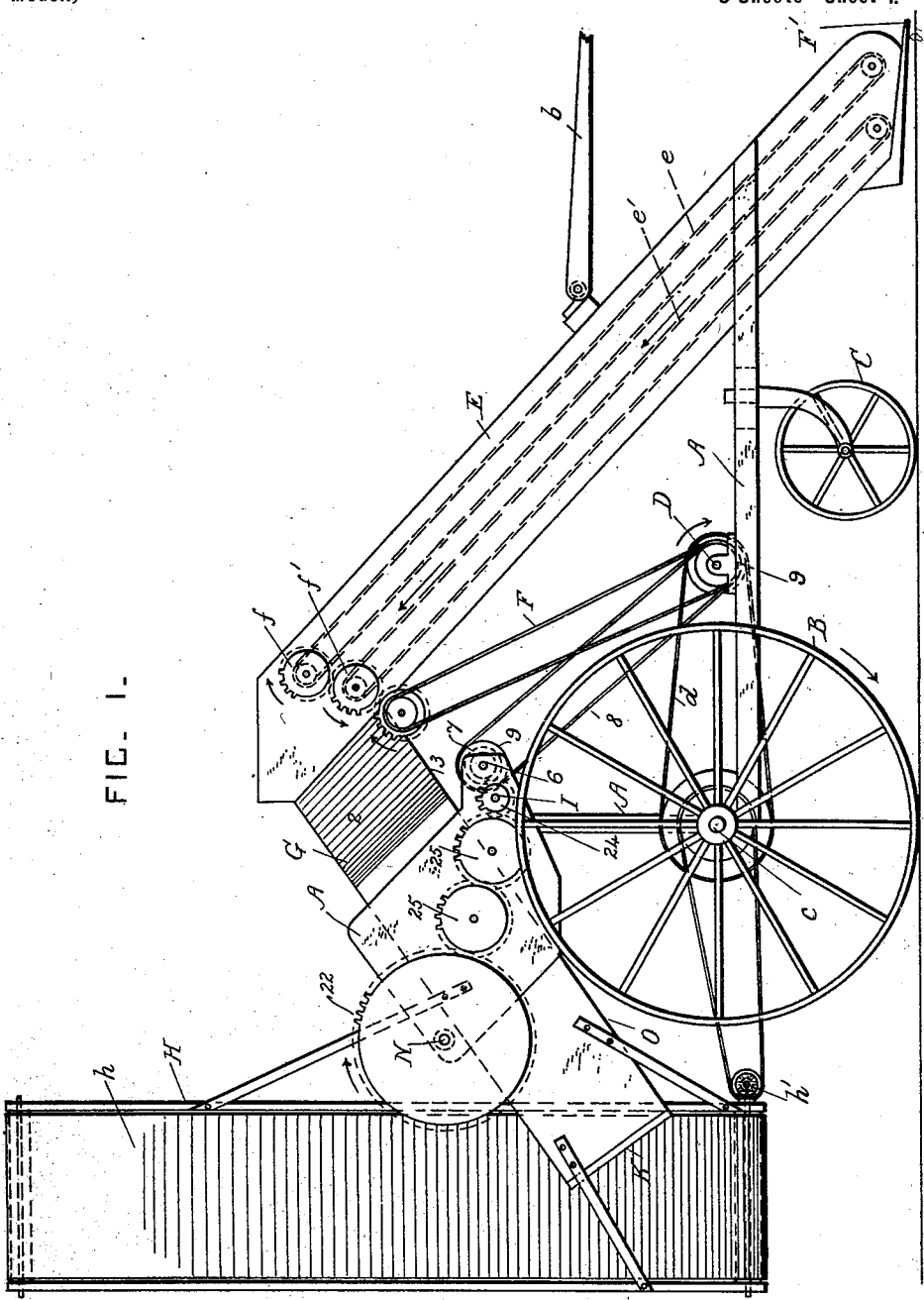

No. 696,207. Patented Mar. 25, 1902.
E. J. SLOUGH.
HAY MACHINE.
(Application filed Dec. 10, 1901.)
(No Model.) 3 Sheets—Sheet 1.

WITNESSES
INVENTOR
Elmer J. Slough.
by Herbert W. J. Jenner.
Attorney

No. 696,207.  
E. J. SLOUGH.  
HAY MACHINE.  
(Application filed Dec. 10, 1901.)  
Patented Mar. 25, 1902.
(No Model.)
3 Sheets—Sheet 2.
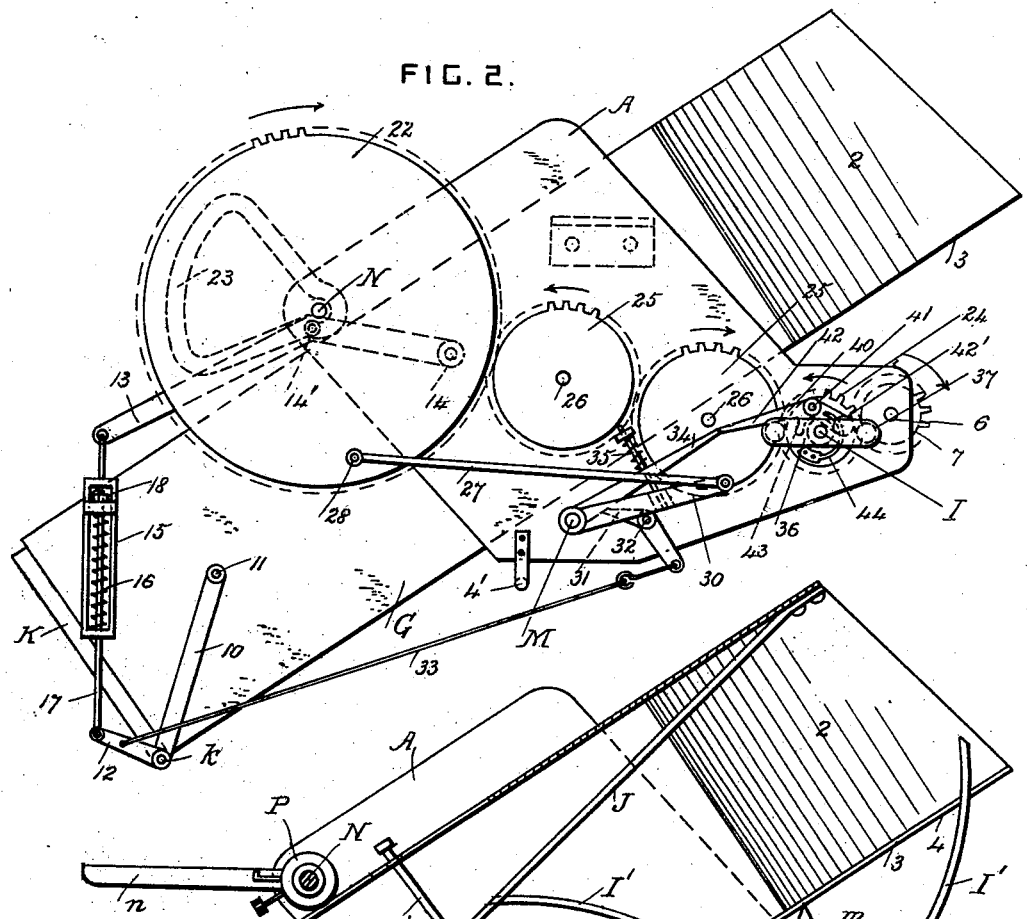
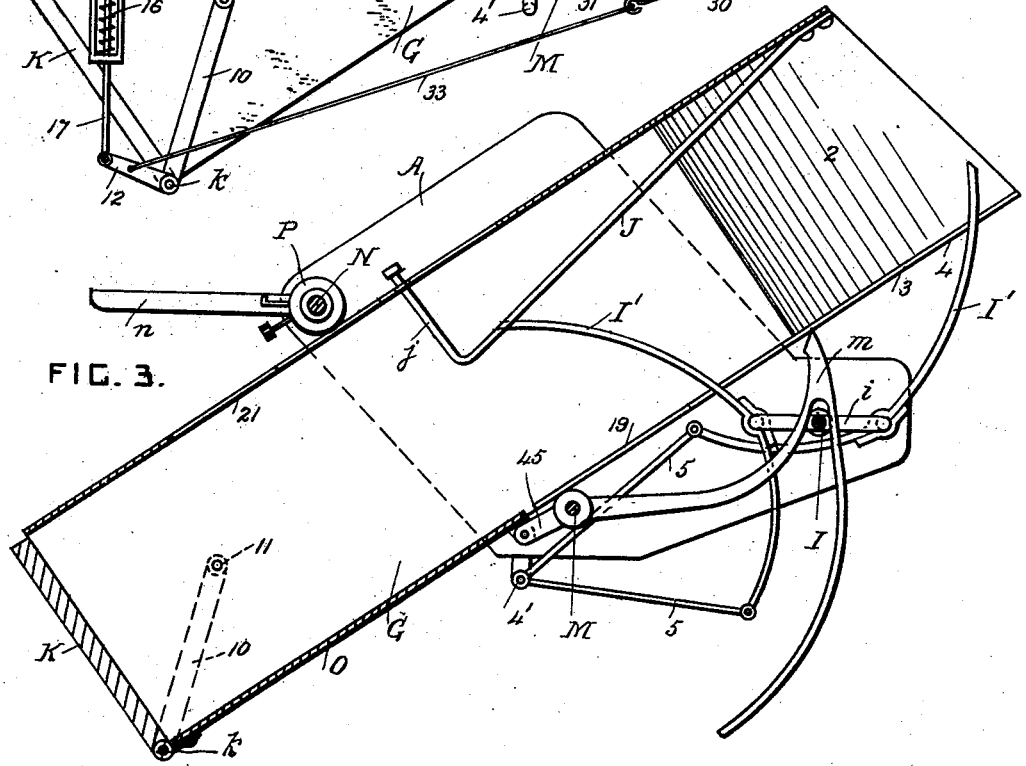
WITNESSES  
INVENTOR  
Elmer J. Slough  
by Herbert W. T. Jenner.  
Attorney

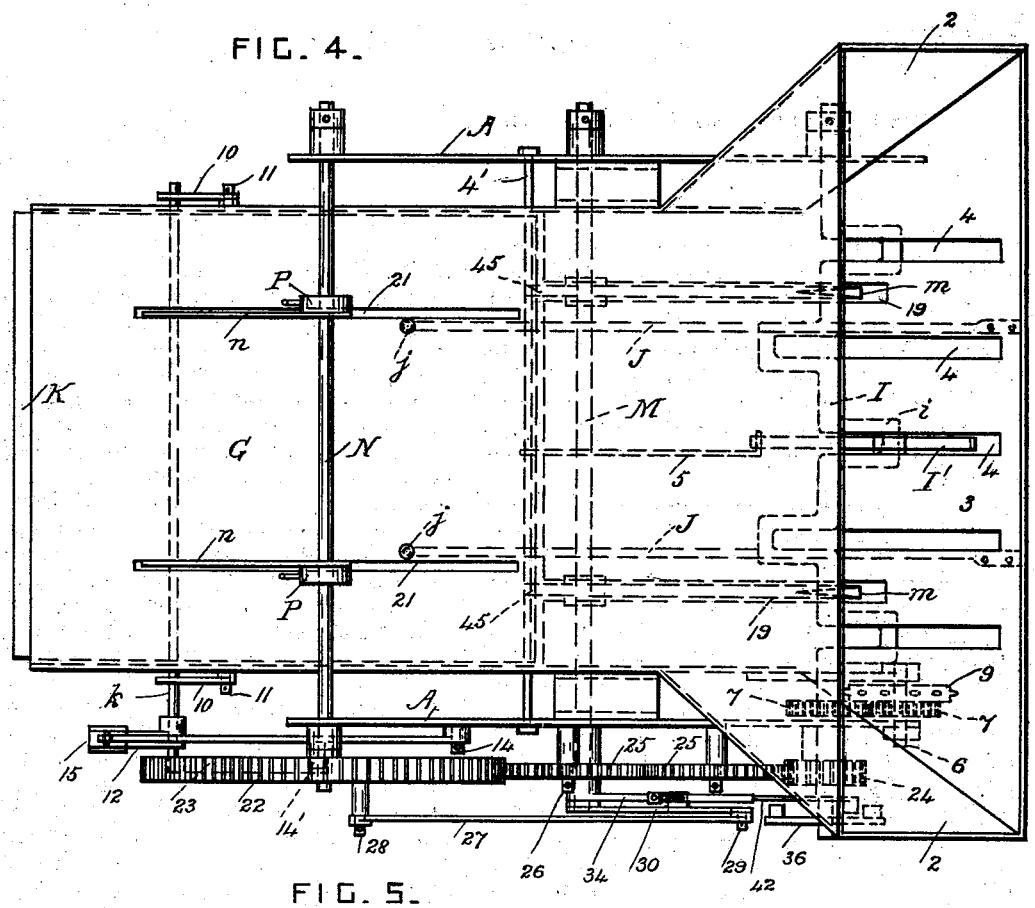

UNITED STATES PATENT OFFICE.

ELMER J. SLOUGH, OF PEORIA, ILLINOIS.

HAY-MACHINE.

SPECIFICATION forming part of Letters Patent No. 696,207, dated March 25, 1902.

Application filed December 10, 1901. Serial No. 85,415. (No model.)

*To all whom it may concern:*

Be it known that I, ELMER J. SLOUGH, a citizen of the United States, residing at Peoria, in the county of Peoria and State of Illinois, have invented certain new and useful Improvements in Hay-Machines; and I do hereby declare the following to be a full, clear, and exact description of the invention, such as will enable others skilled in the art to which it appertains to make and use the same.

This invention relates to machines for loading and baling hay in the field; and it consists in the novel construction and combination of the parts hereinafter fully described and claimed, whereby the hay is raked up from the ground, is loaded into a baling-press, in which it is formed into bales and discharged, and the bales are elevated and delivered clear of the machine.

In the drawings, Figure 1 is a side view of the machine, showing the general arrangement of its parts. Fig. 2 is a side view of the baling-press. Fig. 3 is a longitudinal section through the baling-press. Fig. 4 is a plan view of the baling-press. Fig. 5 is a front view of the clutch mechanism, drawn to a larger scale. Fig. 6 is a plan view of the same. Fig. 7 is a detail side view of the arm and detent on the needle-shaft.

A is a frame of any approved construction, which is mounted on main wheels B and caster-wheels C, so that it can be drawn about the hay-field by means of a draft-pole $b$. The main wheels B are mounted on an axle $c$, which is revolved by one or both of the said main wheels as the machine is drawn along.

D is a counter-shaft journaled in the frame A and driven continuously from the axle $c$ as the machine is drawn forward by means of sprocket-wheels and a drive-chain $d$.

E is a hay-loader of approved construction, which is supported by the frame A at the front end of the machine. This hay-loader is provided with two endless conveyer-belts $e\ e'$, which are arranged one above the other in an inclined position and are supported by suitable rollers. The rollers at the upper end of the hay-loader are connected together by intergearing toothed wheels $f$, so that the two conveyer-belts are constrained to move in opposite directions. The toothed wheels $f$ and the rollers are revolved from the counter-shaft D by means of suitable intermediate driving devices F, which will cause them to revolve, so as to move the belts in the directions of the arrows in Fig. 1. The lower end portion of the hay-loader is provided with suitable projecting rake-teeth F', which pick up the loose hay from the ground and guide it into the space between the two conveyer-belts. These belts conduct the hay to the upper end of the hay-loader and discharge it into the upper end of the baling-chamber.

G is the baling-chamber, in which the hay is pressed into oblong square-cornered bales and tied with twine or wire at each end. The baling-chamber G is inclined in the opposite direction from the hay-loader, and it is supported by the frame A over the axle $c$. The baling-chamber and the mechanism by means of which the hay is baled and bound in it will be more fully described hereinafter.

After the hay has been baled and bound the bales of hay are discharged one after another from the lower end of the baling-chamber and are received upon an elevator H. This elevator H is supported from the frame A in any approved manner, and it is provided with an endless conveyer-belt $h$, carried by suitable rollers at its ends. The lower roller of the conveyer is driven from the axle $c$ by means of beveled toothed wheels $h'$ and intermediate driving devices. The elevator H extends in an inclined position laterally of the machine, so that the bales are elevated and are discharged clear of the track or path of the machine and may be received in a wagon or cart for carrying them away.

The upper part of the press-chamber has converging sides 2 and a lower side or table 3, which has a series of longitudinal slots 4 in it. The upper part of the chamber forms a sort of hopper for the hay, which falls upon the table and slides down it. The hay is slightly compressed between the elevator-belts $e\ e'$, and owing to the inclination of the press-chamber it slides down the table by gravity into engagement with the packing mechanism, and no intermediate conveying mechanism is required between the hay-loader and the packing mechanism of the press.

I is the packer-shaft, which is journaled in the frame A under the table and which has a series of cranks $i$ formed in it.

I' represents the packers, which are mounted on the cranks $i$ and which work through the slots in the table. The packers are arranged at intervals across the press-chamber, and as many are used as is found to give the best result. The cranks engage with the middle parts of the packers, and the lower ends of the packers are connected to a stationary cross-bar 4' by means of pivoted rods 5.

J represents inclined spring-bars, having hay-stops $j$ at their lower ends. These hay-stops are portions of the bars set at an angle to the main parts of the bars, and they project upwardly and slide in holes at about the middle of the top of the press-chamber. The upper end portions of the spring-bars are secured to the top of the press-chamber, and the spring-bars bear downwardly on the hay. When the packer-shaft is revolved, the packers pack the hay into the lower part of the press-chamber. The spring-bars rise as the hay is forced under them and descend when the hay is packed into a bale in the lower rectangular part of the press-chamber, so that the stops $j$ prevent the hay from moving upwardly in the press-chamber. The packer-shaft is revolved from a short shaft 6, journaled crosswise under the press-chamber, by means of intergearing toothed wheels 7, and the shaft 6 is revolved from the counter-shaft D by means of a drive-chain 8 and sprocket-wheels 9. The function of the toothed wheels 7 is to reverse the direction of the motion of the counter-shaft.

The press or baling chamber G is provided with a pivoted end-gate K, which normally closes its outlet. This end-gate is provided with a shaft $k$ at its lower edge, and this shaft is journaled in the lower parts of two arms 10. The upper parts of these arms are pivoted to the sides of the baling-chamber by pins 11. The binding mechanism is operated intermittently and is set in motion by the pressure of the bale of hay against the end-gate, which causes the said end-gate to move rearwardly to a slight extent, but not sufficient to relieve the unbound bale of the pressure by which it is held in shape. An arm 12 is secured on one end of the shaft $k$. A lever 13 is pivoted on a pin 14, which projects from the side of the press-chamber, and this lever has a roller 14' at its middle part for operating it. A frame 15 is pivoted to the free end of the lever 13, and 16 is a spring which works in the said frame. The free end of the arm 12 is operatively connected with the spring by a rod 17, so that the spring normally holds the end-gate closed and permits it to move to a very small extent rearward without moving the lever 13. The rod 17 is provided with a nut 18 for regulating the pressure of the spring and adjusting the extent of the rearward motion of the end-gate, as this has to be prearranged and set with great nicety.

M is the needle-shaft, journaled in the frame A under the baling-chamber behind the packer-shaft, and $m$ represents two needles secured on the said shaft. These needles work through longitudinal slots 19 in the table 3.

N is the kicker-shaft, journaled in the frame A above the baling-chamber behind the hay-stops, and $n$ represents kickers secured on the said shaft. These kickers consist of arms which work through longitudinal slots 21 in the top of the press-chamber and which eject the bale at the proper time. A toothed wheel 22 is secured on one end of the kicker-shaft N and has a cam 23 formed in one side of it. This cam engages with the roller 14' of the lever 13 and operates to throw open the end-gate at the proper time. The packer-shaft I has a toothed wheel 24 mounted loosely on it, and this toothed wheel is operatively connected with the toothed wheel 22 on the kicker-shaft by means of two intergearing toothed idle wheels 25, which are journaled on pins 26, projecting from one side of the press-chamber. The toothed wheels 24, 25, 25, and 22 are preferably so proportioned that the packer-shaft makes four revolutions to one revolution of the kicker-shaft. The needle-shaft M is operated from the kicker-shaft by means of a connecting-rod 27, which engages with a crank-pin 28, projecting from the toothed wheel 22, and with a pin 29 on an arm 30, which is secured on one end of the needle-shaft.

The toothed wheel 24 is connected with the packer-shaft by clutch mechanism which is controlled by the arm 12 on the shaft of the end-gate. This clutch mechanism is preferably constructed as follows: A trip-lever 31 is pivoted on a pin 32, projecting from the frame A, and its lower end is connected with the arm 12 by means of a jointed rod 33 or other equivalent flexible connection. A detent 34 is pivoted on the needle-shaft M and is connected with the arm 30 on said shaft by a spring 35. The packer-shaft I has a clutch member 36 secured on it, and this clutch member is provided with two laterally-projecting rollers 37. The toothed wheel 24 on the packer-shaft has a dog 40 pivoted to it by means of a pin 41, and this dog has a nose 42, which is arranged in the path of the end of the detent 34 when the said detent is in its normal position. The dog 40 also has a projection 42' for engaging with the rollers of the clutch member 36 and a stop 43 for bearing on the hub of the clutch member. A spring 44 is provided and operates to move the dog into connection with the clutch member when released from the detent. When the pressure of the baled hay on the end-gate turns the arm 12 slightly, the upper end of the trip-lever 31 raises the detent against the pressure of the spring 35 out of engagement with the nose of the dog 40.

The dog being thus released is turned on its pivot by its spring 44, so that its projection 42' is moved into the path of one or the other of the rollers 37 of the clutch member which is being revolved by the packer-shaft. The packer-shaft now revolves the toothed wheel 24 and actuates the kicker-shaft and the needle-shaft by means of the toothed wheels and driving devices hereinbefore described.

The baling or press chamber G has a movable bottom-plate O at its lower part, the lower end of which is pivoted to the shaft $k$ of the end gate. The upper end of the plate O is pivoted to short arms 45 on the shanks of the needles, so that when the needles are moved upward the plate O is drawn downward and forward toward the packer-shaft. This motion of the plate O presses the end-gate hard against the baled hay at the time when the twine, wires, or cords are being tightened around the bale and knotted, so as to secure the hay in the form of a bale. The baled hay is squeezed tightly between the end-gate and the needles by the forward motion of the plate O, and this motion also releases the hay slightly in a vertical direction at the same time, thereby giving the bale a good shape.

The kicker-shaft is revolved intermittently in one direction. The needle-shaft is oscillated back and forth by means of its connecting-rod, because the arm 30 is longer than the distance between the kicker-shaft and the crank-pin 28.

P represents the knotters for the twine, secured on the kicker-shaft close to the kickers. These knotters are not herein fully described and shown, as they are knotters of approved construction, such as used on grain-binding harvesting-machines. The twine is passed under the hay before the hay is baled, and the twine is connected to the knotters in the usual way. When the needles are raised, they carry a bight of the twine with them, and their points pass close adjacent to the knotters. The knotting mechanism knots the twine and cuts it off in the usual manner, leaving the rear ends of the twine connected to the knotters, so that the twine is arranged behind the next bale as the hay is forced into the baling-chamber. The continued motion of the kicker-shaft causes the needles to descend, and the cam throws open the end-gate. At this time the revolving kickers strike the bale and eject it from the baling-chamber, and the continued motion of the said cam closes the end-gate, the joint in the rod 33 permitting this to be accomplished before the detent digengages the clutch mechanism.

What I claim is—

1. The combination, with a hay-loader, of a hay-baling chamber arranged in an inclined position and having slots in its lower side or table, the upper part of the said chamber being connected with the top of the hay-loader, and packers which work in said slots and the pack the hay which slides down the inclined table, substantially as set forth.

2. The combination, with a hay-loader, of a hay-baling chamber arranged in an inclined position and having slots in its lower side or table, an inclined hopper having converging sides and connecting the said chamber and hay-loader, and packers which work in the said slots and pack the hay which slides through the said hopper and down the inclined table, substantially as set forth.

3. The combination, with a hay-loader provided with a pair of inclined elevators between which the hay is pressed and elevated, of an inclined hay-baling chamber provided with slots in its lower side or table and receiving the hay from the said hay-loader, and packers which work in the said slots and pack the hay which slides over the said table, substantially as set forth.

4. The combination, with a hay-loader, of a hay-baling chamber provided with an end-gate and having slots in its lower side or table, said chamber receiving the hay from the said loader, a revoluble packer-shaft provided with packers which work in some of the said slots and operate continuously to pack the hay against the said end-gate, and reciprocatory binding-needles which work in other of the said slots and which operate intermittently and press the packed hay against the end-gate after it has been packed by the packers, substantially as set forth.

5. The combination, with a hay-baling chamber having slots in its lower side or table, of inclined spring stop-bars having their front ends secured to the top of the chamber and having lower end portions set at an angle to their main portions and sliding in holes in the middle portion of the top of the chamber, and packers which work in the said slots of the table and pack the hay in the said chamber, substantially as set forth.

6. The combination, with a hay-baling chamber, and arms pivoted to the rear part of the said chamber; of an end-gate pivoted to the said arms and normally closing the said chamber, a bottom portion also pivoted to the said arms, a needle-shaft under the said chamber, and binding-needles operated by the said needle-shaft and provided with arms which are pivotally connected with the said bottom portion, substantially as set forth.

7. The combination, with a hay-baling chamber, of an end-gate for the chamber, a movable bottom portion for the rear part of the said chamber connected to the said end-gate, a needle-shaft under the said chamber, binding-needles operated by the said needle-shaft and provided with arms which are pivotally connected with the said bottom portion, and means for supporting the rear part of the said bottom portion and the said end-gate, substantially as set forth.

8. The combination, with a hay-baling chamber, and a movable end-gate therefor; of lever mechanism provided with a spring connection which normally holds the end-gate closed and permits it to move back to a limited extent, a continuously-operated driving-shaft, packing mechanism operated by the said shaft and packing the hay against the end-gate, intermittently-operating self-binding mechanism, driving devices for the said self-binding mechanism provided with a clutch which connects them with the said driving-shaft, and having also a cam which controls and operates the said lever mechanism, and clutch-operating mechanism connected with the said end-gate whereby the self-binding mechanism is actuated when the hay-presses back the end-gate to a prearranged extent, substantially as set forth.

9. The combination, with a hay-baling chamber, and a movable end-gate therefor; of lever mechanism provided with a spring connection which normally holds the end-gate closed and permits it to move back to a limited extent, a cam which controls and operates the said lever mechanism, and driving devices for revolving the said cam intermittently controlled by the said end-gate, substantially as set forth.

10. The combination, with a hay-baling chamber, and a movable end-gate therefor; of lever mechanism provided with a spring connection which normally holds the end-gate closed and permits it to move back to a limited extent, a cam which controls and operates the said lever mechanism, a driving-shaft, intermediate driving mechanism provided with a clutch and connecting the said cam with the driving-shaft, and trip mechanism actuated by the said end-gate and operating to place the said clutch in engagement with the said driving-shaft, substantially as set forth.

11. The combination, with a hay-baling chamber, and a movable end-gate therefor; of a kicker-shaft provided with means for discharging the bale from the said chamber, a cam secured on the kicker-shaft, lever connections between the said cam and end-gate, and means for revolving the kicker-shaft intermittently to open the end-gate and discharge the bale, substantially as set forth.

12. The combination, with a hay-baling chamber, and a spring-supported end-gate therefor; of an arm secured to the end-gate, mechanism for opening the end-gate provided with a clutch for operating it intermittently, a driving-shaft, a detent for holding the said clutch out of engagement with the said driving-shaft, a trip for operating the said detent, and a flexible connection between the said trip and arm, substantially as set forth.

13. The combination, with a hay-baling chamber, of a revoluble kicker-shaft provided with discharging devices for the bales, a toothed driving-wheel secured on the said kicker-shaft and provided with a crank-pin, a driving-shaft, a clutch on the said driving-shaft, toothed driving-wheels connecting the said clutch with the aforesaid toothed wheel, a needle-shaft, binding-needles operated by the said needle-shaft, an arm on the needle-shaft, and a connecting-rod between the said arm and crank-pin, said kicker-shaft and needle-shaft being operated simultaneously when the clutch is placed in engagement with the said driving-shaft, substantially as set forth.

In testimony whereof I affix my signature in presence of two witnesses.

ELMER J. SLOUGH.

Witnesses:
JOHN A. WEST,
ROBERT H. LOVETT.